Patented Jan. 24, 1939

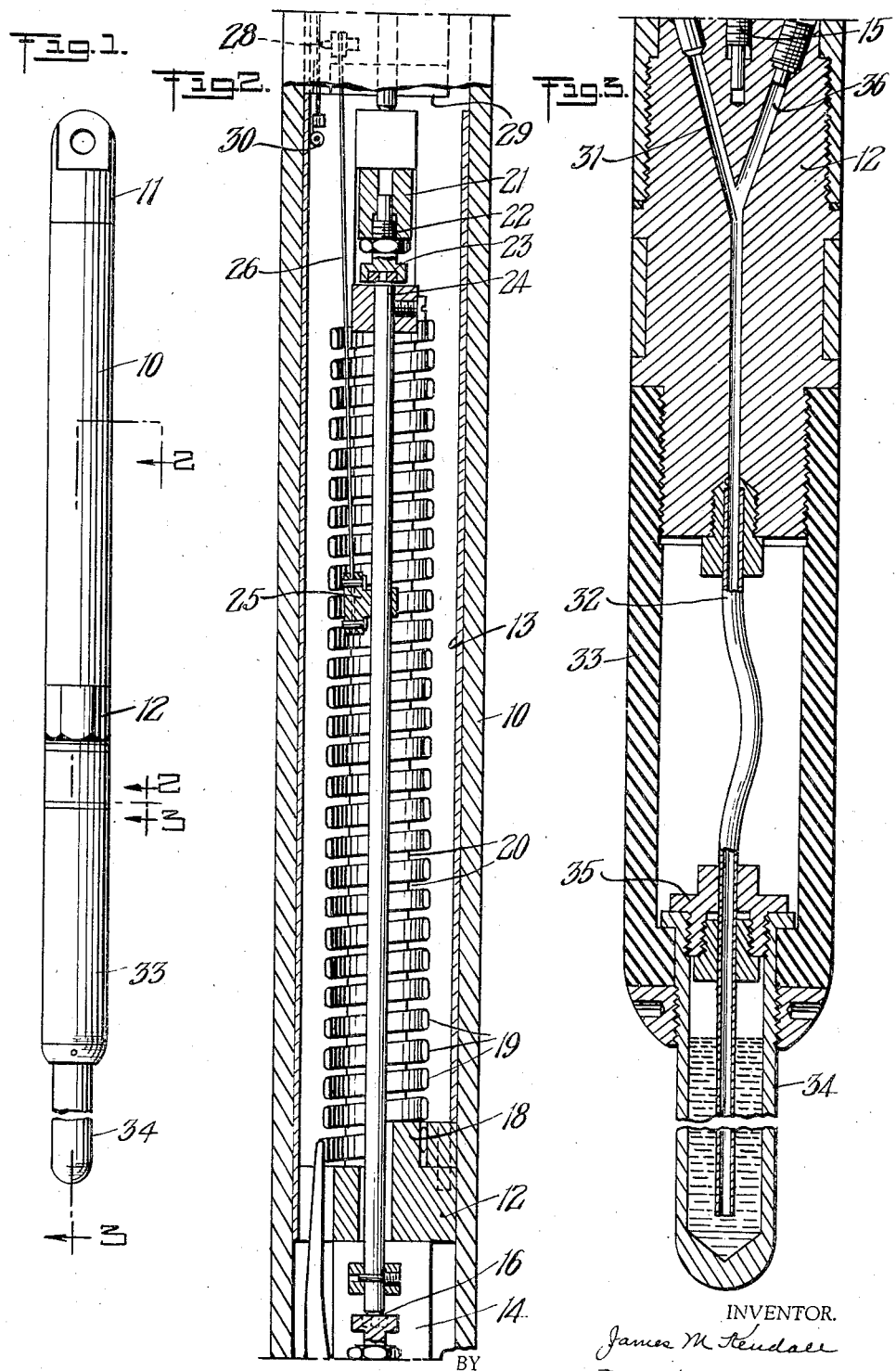

2,144,762

UNITED STATES PATENT OFFICE 2,144,762

RECORDING THERMOMETER

James M. Kendall, Tulsa, Okla., assignor to Geophysical Research Corporation, New York, N. Y., a corporation of New Jersey Application September 29, 1937, Serial No. 166,302

2 Claims. (Cl. 73—369)

This invention relates to recording thermometers and has for an object an accurate and quick responsive device particularly adapted for use in determining temperatures at different depths within bore holes extending into the earth.

Preferably, a thermometer embodying the invention comprises a helix of Bourdon tubing, one end of which is fixed and the other end of which is connected to a stylus, the position of which varies with the twisting of the helix due to pressure variations therein. A properly lined strip of paper is caused to move past the stylus at a uniform speed so that there is recorded on the paper a chart of the changes in position of the stylus. A pipe leads from the fixed end of the tubing to a point near the bottom of a bulb containing volatile liquid such, for example, as methyl chloride, butane or other liquid having similar characteristics. The bulb is separated from the helix through the intermediary of a spacer made of heat insulating material. The helix, stylus and associated parts are enclosed in a protective casing so that when the device is lowered into a bore hole there is no danger of injury thereto while the bulb is composed of brass or other material of sufficient strength that it does not need a protector. The device is lowered into a bore hole by use of any suitable means and the free end of the helix rotates in response to pressure variations in it due to changes in the vapor pressure of the volatile liquid in the bulb, such pressure variations being the result of temperature changes in the liquid. The stylus is correspondingly actuated to preferably make a record of the pressure variations and such record is proportional to the temperature variations and therefore indicates temperatures at different depths.

Other objects, novel features and advantages of this invention will become apparent from the following specification and accompanying drawing, wherein:

Fig. 1 is an exterior view of a device embodying the invention;

Fig. 2 is a longitudinal section substantially on the line 2—2 of Fig. 1, and

Fig. 3 is a similar section substantially on the line 3—3 of Fig. 1.

A casing 10 is provided at one end with a cap 11 and a plug 12 is screwed into the opposite end of the casing. A metal tube 13 is attached to the plug 12 which is cut away at 14 and in the bottom of the recess thus formed there is provided an adjustable support 15 into which is screwed a bearing jewel 16. At the inner end of the plug 12 is provided a projection 18 which is surrounded by one end of a coil 19 formed from Bourdon tubing. A bar 20 extends from the upper end of the plug 12 and at its upper end carries a bracket 21 in which is provided an adjustable support 22 provided with a bearing jewel 23. A shaft 24 is rotatably supported by the bearing jewels 16 and 23 and extends through the upper part of the plug 12. A collar 25 is fixed to the shaft 24 and carries a resilient arm 26 at the end of which is provided a stylus 28. A carriage 29 is supported within the tube 13 by rollers 30 and drive mechanism (not shown) is provided for moving the carriage longitudinally of the tube 13. The drive mechanism above referred to is the same as that disclosed in detail in the patent to F. M. Kannenstine, No. 1,837,222 and forms no part of the present invention.

The lower end of the tubing 19 extends into the upper end of a passageway 31 in the plug 12, and the lower end of said passageway receives one end of a pipe 32. A sleeve 33 of Bakelite or other similar heat-insulating material is threaded on to the bottom end of the plug 12 and supports a bulb 34 of brass or other suitable metal. The pipe 32 passes through the cap 35 sealing the bulb 34 and extends nearly to the bottom of the bulb 34. The bulb 34 contains a volatile liquid such as methyl chloride, butane or the like in an amount sufficient that the tubing 19, passageway 31, pipe 32 can be filled with liquid from the bulb while leaving sufficient liquid in the bulb to seal the bottom of the pipe 32.

After the device has been assembled except for the introduction of the body of liquid, air is exhausted from the tubing 19, passageway 31, pipe 32 and bulb 34 through the passage 36 and the bulb 34 is cooled by any suitable means to a temperature below the vaporizing temperature of the volatile liquid. Then, without breaking the vacuum, the volatile liquid is introduced through the passageway 36 in predetermined amount and the passageway 36 sealed off. As the temperature in the bulb 34 rises to atmospheric temperature, vapor from the volatile liquid fills the pipe 32, passage 31, tubing 19 and the space in the bulb above the level of the volatile liquid.

The deflection of the coil 19 is proportional to the vapor pressure of the liquid in the bulb 34 only and is independent of the vapor pressure of the liquid elsewhere in the system. The pressure applied to the interior of the coil 19 is always the pressure applied to the surface of the liquid in the bulb or the vapor pressure of that liquid. In the drawing is disclosed the condition of the device before being put into use. The interior of the coil 19 is filled with vapor and all the liquid is in the bulb 34. Now assume that the device is lowered into a bore hole and the liquid in the bulb is subjected to a higher temperature. The vapor tension of the vapor above the liquid in the bulb 34 will increase over that of the vapor in the coil 19. Liquid will then be forced into the coil 19 until the pressure therein exactly equals that in the bulb. Conversely if the liquid in the bulb is cooled, the vapor tension of the vapor above the liquid in the bulb will decrease and liquid will be forced out of the coil and back into the bulb until pressure equilibrium is attained. If the bulb be held at constant temperature but the temperature of the pressure coil be changed, no error will be produced. For example, if the temperature of the coil is suddenly reduced, the vapor pressure within the coil will tend to be reduced but immediately this happens more liquid will be forced into the pressure tube from the bulb until the pressure within the tube is again exactly equal to that within the bulb. The stylus 28 is actuated by deflection of the coil 19 to chart the changes in pressure and as such changes are proportional to temperature changes in the liquid in bulb 34, an accurate record of temperature at different depths can be obtained.

The heat insulating sleeve 33 serves as a mechanical support for the bulb 34 and prevents heat transfer between the bulb and the body of the instrument. The thermal inertia of the device is therefore only that of the bulb and the contained liquid, which can be made sufficiently small so that the device responds very quickly to temperature changes.

I claim:

1. A recording thermometer for use in bore holes comprising a tubular casing, a plug closing one end of said casing, a heat insulating tube carried by said plug and constituting an extension of said casing, a bulb attached to the free end of said tube and projecting therebeyond, a coil of Bourdon tubing arranged in said casing with one end closed and the other end fixed to said plug, means associated with said coil for recording movement of its free end, a conduit extending from the fixed end of said coil nearly to the bottom of said bulb, and a supply of volatile liquid in said bulb.

2. A recording thermometer for use in bore holes comprising a tubular casing, a plug closing one end of said casing, a heat insulating tube carried by said plug and constituting an extension of said casing, a bulb attached to the free end of said tube and projecting therebeyond, a pressure-sensitive element in said casing supported by said plug, recording means associated with said pressure-sensitive element, a conduit extending from said pressure-sensitive element nearly to the bottom of said bulb, and a supply of volatile liquid in said bulb.

JAMES M. KENDALL.